H. P. TAYLOR

PROCESS FOR PRESSING AND PACKING MANUFACTURED TOBACCO

Sept. 1, 1931. Original Filed Jan. 11, 1929 Re. 18,173

H. P. TAYLOR,
Inventor

By Paul B. Eaton
Attorney

Reissued Sept. 1, 1931

Re. 18,173

UNITED STATES PATENT OFFICE

HENRY P. TAYLOR, OF WINSTON-SALEM, NORTH CAROLINA

PROCESS FOR PRESSING AND PACKING MANUFACTURED TOBACCO

Original No. 1,720,015, dated July 9, 1929, Serial No. 331,768, filed January 11, 1929. Application for reissue filed June 26, 1931. Serial No. 547,169.

This invention relates to a process of packing plug and twist tobacco in caddies in such a manner as to prevent the outer layer from having a slick appearance which interferes with sale as first grade tobacco.

An object of my invention is to provide means for packing and pressing plug and twist tobacco in such a manner as to prevent the outer layer of the caddies and boxes from having a slick appearance due to coming in contact with the head members of the caddy or box.

Another object of my invention is to provide the process of pressing layers of unpressed or partially pressed plugs or twists of manufactured tobacco in presses and placing a dummy layer of fibrous material between the tobacco and the head members of the presses and pressing the dummy layers and tobacco at one operation, said dummy layers being resilient and approaching the sponginess and resiliency of plugs of tobacco so that such resilient dummy layers will impress their surfaces on the surfaces of the outer plugs of tobacco and in turn the outer plugs of tobacco will impress their surfaces on the dummy layers and then, when the tobacco is thus pressed, the whole block of tobacco together with the dummy layers is taken out as a whole and placed in a caddy and sealed with top and bottom members and thus the entire block of tobacco is covered with a rough and ready finish, and when the tobacco is unpacked for sale and the dummy layer removed the end plugs will have the appearance of middle plugs and will have no slick appearance, but will have a rough and ready outer surface and in this way the loss which arises from the end plugs of tobacco is eliminated, and such plugs are sold as first grade tobacco without loss to the retailer.

Some of the objects of my invention having been stated, other objects will appear as the description proceeds when taken in connection with the accompanying drawings in which—

Figure 1:
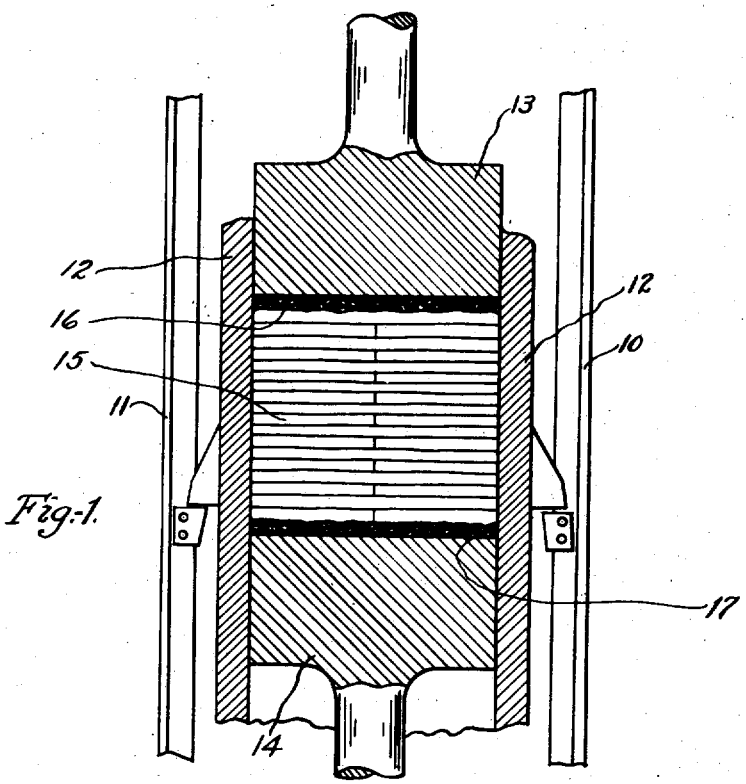
Figure 1 is a side elevation, partly in cross-section of a tobacco press, showing my resilient pad in use.
Figure 2:
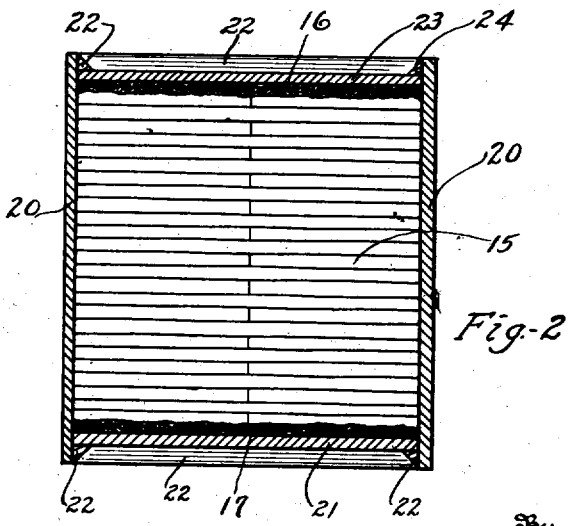
Figure 2 is a cross-sectional view through a box or caddy of tobacco showing the pressed mass of tobacco and the fibrous dummy plugs in position in the caddy ready for shipment.
Figure 3:
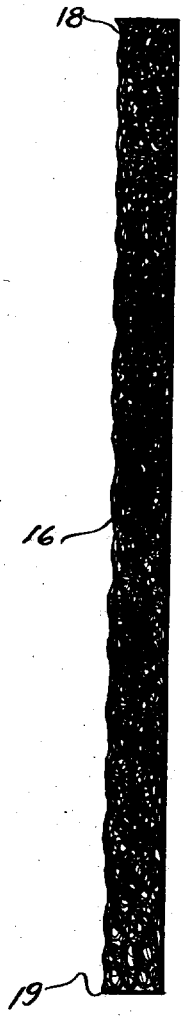
Figure 3 is an enlarged edge view of my resilient pad which I use in pressing and packing tobacco, after the same has been pressed with the tobacco.

Referring more particularly to the drawings, the numerals 10 and 11 indicate the supports for a tobacco press compartment 12, which compartment 12 has the heads 13 and 14 and in many instances the portion 13 is stationary with the portion 14 being compressed or vice versa.

The reference numeral 15 indicates the plugs of tobacco and reference characters 16 and 17 indicate the fibrous or dummy layers of material which are made to fit the inside of the press and are slightly larger than the press so that when the tobacco is placed in the press with the dummy layers 16 and 17 at each end thereof and pressure is applied the dummy layers 16 and 17 will bulge slightly and form the points 18 and 19 which prevents the squirting or leaking of the press under the enormous pressure which is applied in pressing tobacco.

When the tobacco is thus pressed with the dummy layers of material 16 and 17 at each end of the compressed mass the entire mass of plugs and dummy layers are taken out of the press and placed in the caddy or box 20 with the bottom member 21 therein being held in by the strips 22 and then pressure is applied to the tobacco in the caddy and the head member 23 is securely fastened in position by the strips 24 and thus the tobacco is packed in the form in which it comes from the press with the dummy layers being attached to the tobacco.

If necessary I can put a sheet of paraffin paper or other suitable material between the dummy layers and the tobacco to keep the fibers from the dummy layers 16 and 17 from becoming embedded in the outer surfaces of the end plugs of tobacco.

These dummy layers 17 and 16 are made of comminuted fibrous material and in some instances this is made of a vegetable material and is made with thick and thin spots very similar to a plug of tobacco which has thick and thin spots therein and when the plugs of tobacco or the dummy layers are placed under great pressure these thick and thin places cause the rough and ready appearance of the plugs of tobacco or the dummy layers.

When the tobacco is pressed in the manner described the thick and thin places in the tobacco will impress certain irregularities on the dummy layers and the thick and thin places in the dummy layers will impress certain irregularities on the outer surfaces of the end plugs of tobacco. In other words the dummy layers are adapted to behave in the same manner as plugs of tobacco the only difference being that they are very inexpensive and when the tobacco, caddy or box is opened up these dummy layers are discarded and fresh tobacco is taken from the box which has the end plugs thereof with the rough and ready appearance and which enables the retailer to sell these plugs as first class plugs of tobacco which they really are. There is no deception of the consumer because he receives a plug of tobacco which is just as good as the tobacco in the central portion of the caddy.

The dummy layers 16 and 17 being between the plugs of tobacco 15 and the head members of the press 13 and 14 and the head members 21 and 23 of the caddy or box receive, themselves, on their outer surfaces the slick or unnatural finish of the head members of the press and the head members of the caddy or box and in this way the dummy layers thoroughly protect, at all times, the outer surfaces of the end or outside plugs of tobacco from having a slick or unnatural finish imparted to them by the head members of the press or the head members of the caddy or box.

In the drawings and specification I have set forth a preferred embodiment of my invention, and although specific terms are employed, they are used in a generic and descriptive sense only, and not for purposes of limitation, the scope of my invention being set forth in the appending claims.

By the term dummy layer, used in this case, is meant any suitable layer of material other than tobacco.

What I claim is:

1. The process of pressing and packing tobacco which comprises placing a series of pieces of tobacco in a press with dummy layers of fibrous material between the press heads and the tobacco and pressing the tobacco and the dummy layers at the same time then placing the compressed tobacco with dummy layers in a box and sealing the box by placing head members therein.

2. The process of pressing and packing tobacco which comprises placing plugs of tobacco in a press with dummy layers of fibrous material more elastic than tobacco between the press heads and the tobacco and pressing the tobacco and the dummy layers at the same time, then placing the compressed tobacco with the same dummy layers in a box and sealing the box by placing head members in said box.

3. The process of pressing and packing tobacco which comprises placing plug and twist tobacco in a press with dummy layers of fibrous material more elastic than the tobacco and having portions of unequal density between the press heads and the tobacco and pressing the tobacco and the dummy layers at the same time then placing the compressed tobacco with the same dummy layers in a box and sealing the head members into said box.

4. The process of packing and pressing plug tobacco which comprises compressing plugs of tobacco in super-imposed layers between dummy layers of material having resilience and sponginess substantially similar to the resilience and sponginess of plug tobacco, and sealing the compressed mass of plugs and dummy layers under compression in a caddy.

5. The process of packing and pressing plug tobacco which comprises compressing in a caddy plugs of tobacco in super-imposed layers between dummy layers of material having resilience and sponginess substantially similar to the resilience and sponginess of plug tobacco, and sealing the caddy to maintain the compressed mass of plugs and dummy layers under compression.

6. That process of packing plug tobacco which consists in placing dummy layers of fibrous material over the exposed faces of the end plugs of a mass of super-imposed plugs, applying pressure to said plugs and fibrous layers in a caddy, and sealing said mass in the caddy and under such pressure.

7. The process of pressing and packing tobacco which comprises placing super-imposed plugs of tobacco in a press and compressing the series then placing the compressed mass of tobacco in a caddy with dummy layers of substantially the same resilience as the tobacco plugs between the tobacco and the head and bottom members of the caddy, and sealing the caddy while the pads and tobacco are under pressure.

8. That process of packing plug tobacco which comprises compressing layers of plug tobacco in a caddy with dummy pads of comminuted fibrous material having thick and thin spots therein between the tobacco and the ends of the caddy.

In testimony whereof, I have signed my name to this specification.

HENRY P. TAYLOR.